(12) United States Patent
Jing

(10) Patent No.: US 10,663,799 B2
(45) Date of Patent: May 26, 2020

(54) BACKLIGHT MODULE AND LCD

(71) Applicant: Huizhou China Star Optoelectronics Technology Co., Ltd., Huizhou (CN)

(72) Inventor: Xiaohong Jing, Huizhou (CN)

(73) Assignee: HUIZHOU CHINA STAR OPTOELECTRONICS TECHNOLOGY CO., LTD., Huizhou, Guangdong (CN)

( * ) Notice: Subject to any disclaimer, the term of this patent is extended or adjusted under 35 U.S.C. 154(b) by 0 days.

(21) Appl. No.: 16/300,047

(22) PCT Filed: Sep. 27, 2018

(86) PCT No.: PCT/CN2018/107830
§ 371 (c)(1),
(2) Date: Nov. 8, 2018

(87) PCT Pub. No.: WO2019/237564
PCT Pub. Date: Dec. 19, 2019

(65) Prior Publication Data
US 2019/0384118 A1 Dec. 19, 2019

(30) Foreign Application Priority Data
Jun. 15, 2018 (CN) .......................... 2018 1 0622160

(51) Int. Cl.
*G02F 1/13357* (2006.01)
(52) U.S. Cl.
CPC .............................. *G02F 1/133615* (2013.01)

(58) Field of Classification Search
CPC ......... G02F 1/133615; G02F 1/133555; G02F 1/33605; G02F 1/33606
See application file for complete search history.

(56) References Cited

U.S. PATENT DOCUMENTS 7,006,173 B1 *  2/2006  Hiyama ............ G02F 1/133536
                                                          349/61
2004/0095769 A1  5/2004  Huang
(Continued)

FOREIGN PATENT DOCUMENTS

CN          2653542 Y     11/2004
CN        101253442 A      8/2008
(Continued)

*Primary Examiner* — Anabel Ton
(74) *Attorney, Agent, or Firm* — Leong C. Lei

(57) ABSTRACT

The invention provides a backlight module. The backlight module has a cavity, a reflecting cover, a light source and an auxiliary light-guiding diffusion structure. The cavity comprises a reflective surface, a mounting surface connected to the reflective surface, and a light-emitting surface connecting the reflective surface and the mounting surface; the light source a light-emitting diode, the reflecting cover mounted on the mounting surface, the light source being disposed inside the reflecting cover; the auxiliary light-guiding diffusion structure disposed on the reflective surface and able to assist in diffusing the light incident to the reflective surface to improve emission uniformity of the backlight module and display quality. Another object of the invention is to provide an LCD device, using backlight module having a single LED as light source and achieving brightness uniformity, improving display quality of the LCD device, reducing production cost of LCD device and increasing product competitiveness.

9 Claims, 3 Drawing Sheets

(56) References Cited

U.S. PATENT DOCUMENTS

| | | | | |
|---|---|---|---|---|
| 2007/0081361 A1* | 4/2007 | Clary | ............... | G02B 6/0055 |
| | | | | 362/624 |
| 2011/0222267 A1* | 9/2011 | Park | ............... | G02F 1/133615 |
| | | | | 362/97.1 |
| 2014/0160392 A1* | 6/2014 | Li | ............... | G02F 1/133615 |
| | | | | 349/58 |
| 2015/0036335 A1* | 2/2015 | Liu | ............... | F21V 7/09 |
| | | | | 362/235 |
| 2017/0261813 A1* | 9/2017 | Cha | ............... | G02F 1/133308 |

FOREIGN PATENT DOCUMENTS

| | | |
|---|---|---|
| CN | 101956925 A | 1/2011 |
| CN | 102576119 A | 7/2012 |
| CN | 202469764 U | 10/2012 |

\* cited by examiner

BACKLIGHT MODULE AND LCD

BACKGROUND OF THE INVENTION

1. Field of the Invention

The present invention relates to the field of display, and in particular to a backlight module and liquid crystal display (LCD).

2. The Related Arts

With the development of display technology, the panel display devices such as liquid crystal displays (LCDs), due to the advantages of high image quality, power saving, thinness and wide application range, are widely applied to various consumer electronic products, such as, mobile phones, televisions, personal digital assistants (PDA), digital cameras, notebook computers, and desktop computers, and have become mainstream in display devices.

Most of the LCD devices on the market are backlight type LCD devices, which comprise an LCD panel and a backlight module. The operation principle of the LCD panel is to place liquid crystal (LC) molecules in two parallel glass substrates, with many vertical and horizontal thin wires between the two glass substrates. The LC molecules are controlled to change direction by energizing the thin wires or not to refract the light of the backlight module to produce an image screen.

Because the LCD panel is not self-illuminous, the light source provided by the backlight module must be used to display the image normally. Therefore, the backlight module becomes a key component of the LCD device. The backlight module is divided into an edge-lit type backlight module and a direct-lit backlight module according to different incident positions of the light source. The direct-lit type backlight module is configured so that a light source such as a cathode fluorescent lamp (CCFL) or a light-emitting diode (LED) light source is disposed behind the LCD panel, and a planar light is formed by the diffusion plate and supplied to the LCD panel.

With the popularization of large-size LCD devices, the backlight module of the LCD device has gradually increased the demand for process simplification and product thinning. However, currently the direct-lit backlight module is assembled by a plurality of light-emitting strips, and the assembly, wire insertion and wire arrangement process is very complicated, and cannot meet the requirements of the process simplification of the backlight module. The edge-lit backlight module requires a light-guiding plate to guide the light, which increases the overall module weight, and does not satisfy the demands for light-weight and thinness of the backlight module. A one-LED package BLU has emerged to simplify assembly of the module as well as realize the light-weight and thinness requirement. However, the current one-LED package BLU has poor light uniformity, especially in the case where the light mixing distance is small, the light on the light-emitting surface gathers near the light-emitting diode, resulting in light unevenness at a position close to the light-emitting diode and at a position away from the light-emitting diode, that is, the brightness of the position near the light source is greater than the brightness of a position far from the light source.

SUMMARY OF THE INVENTION

The object of the present invention is to provide a backlight module, to ensure brightness uniformity of the backlight module when using a single LED as a light source.

Another object of the present invention is to provide an LCD device, using backlight module having a single LED as a light source and achieving brightness uniformity, able to improve display quality of the LCD device, reduce production cost of LCD device and increase product competitiveness.

To achieve the above object, the present invention provides a backlight module, which comprises: a cavity, a reflecting cover, a light source and an auxiliary light-guiding diffusion structure;

the cavity comprising: a reflective surface, a mounting surface connected to the reflective surface, and a light-emitting surface connecting the reflective surface and the mounting surface;

the light source being a light-emitting diode, the reflecting cover being mounted on the mounting surface, and the light source being disposed inside the reflecting cover;

the reflective surface having an accumulation area and a non-accumulation area outside the accumulation area, and the light source emitting a light directly onto the reflective surface or reflected by the reflecting cover and then incident on the reflective surface, and the light incident to the accumulation area having a density greater than the density of light incident into the non-accumulation zone;

the auxiliary light-guiding diffusion structure being disposed on the reflective surface and located in the accumulation area, and at least a portion of light incident into the accumulation area, after being diffused by the auxiliary light-guiding diffusion structure, emitting towards a direction with respect to the accumulation area away from the light source.

The reflective surface comprises a bottom surface and three side surfaces, the bottom surface is spaced apart from the light-emitting surface, the three side surfaces and the mounting surface surround the bottom surface and are connected to the bottom surface, the light-emitting surface are connected to the three side surfaces and the mounting surface.

The side surfaces are arc surfaces with a side lifted toward the light-emitting surface with respect to the bottom surface.

The accumulation area is located at the bottom surface.

The auxiliary light-guiding diffusion structure comprises: a light incident surface, a diffusion surface connected to the light incident surface, two connecting side surfaces oppositely disposed connected to the light incident surface and the diffusing surface, and a connecting bottom surface connected to the light incident surface, the diffusion surface, and the two connecting side surfaces; the light incident surface, the diffusion surface, the two connecting side surfaces and the connecting bottom surface together form a solid body structure;

the connecting bottom surface is stacked on the bottom surface, the light incident surface intersects the bottom surface to form an acute angle, opening of the acute angle faces the light source, the diffusion surface intersects the bottom surface, and intersection line is located at a side away from the light source.

The light incident surface is a plane, and the diffusion surface is an arc surface.

The reflective surface is a mirror reflective surface or a white reflective surface.

The reflecting cover is C-shaped with an opening facing the reflective surface.

The material of the auxiliary light-guiding diffusion structure is an acrylic material.

The invention also provides an LCD device comprising the above backlight module.

The present invention provides the following advantages: the present invention provides a backlight module. The backlight module comprises: a cavity, a reflecting cover, a light source and an auxiliary light-guiding diffusion structure; the cavity comprising: a reflective surface, a mounting surface connected to the reflective surface, and a light-emitting surface connecting the reflective surface and the mounting surface; the light source being a light-emitting diode, the reflecting cover being mounted on the mounting surface, and the light source being disposed inside the reflector; the auxiliary light-guiding diffusion structure being disposed on the reflective surface and able to assist in diffusing the light incident to the reflective surface to improve light emission uniformity of the backlight module and display quality. Another object of the present invention is to provide an LCD device, using backlight module having a single LED as a light source and achieving brightness uniformity, able to improve display quality of the LCD device, reduce production cost of LCD device and increase product competitiveness.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

To further explain the technical means and effect of the present invention, the following refers to embodiments and drawings for detailed description.

Figure 1:
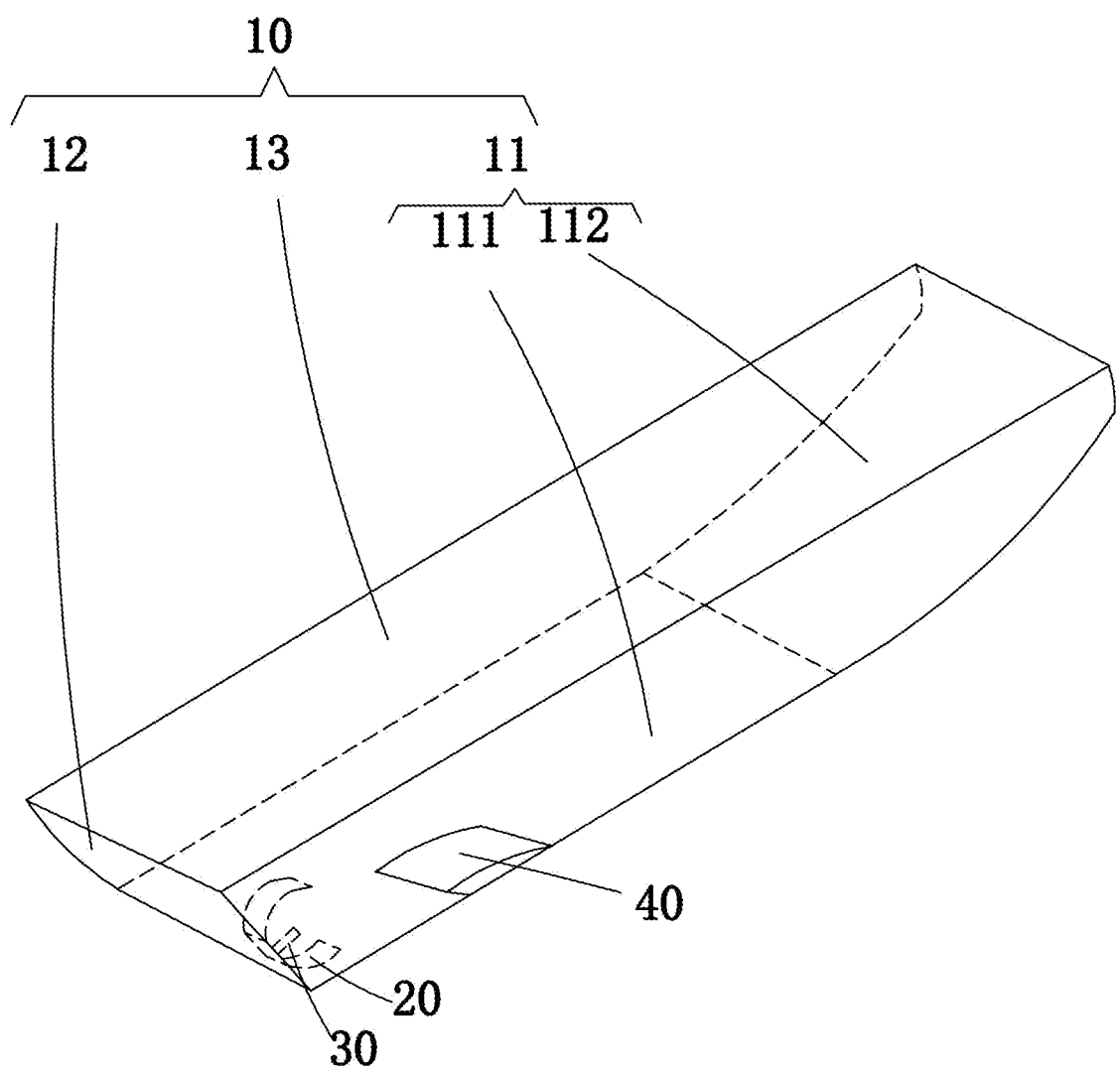
FIG. 1 is a schematic view showing the structure of the backlight module of the present invention.

Refer to FIG. 1. The present invention provides a backlight module, which comprises: a cavity 10, a reflecting cover 20, a light source 30 and an auxiliary light-guiding diffusion structure 40;

the cavity 10 comprises: a reflective surface 11, a mounting surface 12 connected to the reflective surface 11, and a light-emitting surface 13 connecting the reflective surface 11 and the mounting surface 12; the light source 30 is a light-emitting diode (LED), the reflecting cover 20 is mounted on the mounting surface 12, and the light source 30 is disposed inside the reflecting cover 20.

Specifically, since a single LED is used as the light source 30 and is limited by the light mixing distance of the cavity 10, when the light source 30 emits light directly onto the reflective surface 11 or the light is reflected by the reflective cover 20 and then incident upon the reflective surface 11, the light is accumulated on a portion of the reflective surface 11 (generally located near the light source 30), such that the light density in a portion of the reflective surface 11 is greater than the light density in other portions. The light emitted from the light-emitting surface 13 after reflected by the reflective surface 11 is also accumulated in a part of the area, resulting in uneven light emission of the backlight module. In the present invention, the area where the light is accumulated on the reflective surface 111 is defined as an accumulation area. The area outside the accumulation area is a non-accumulation area, that is, the density of light incident into the accumulation area is greater than the density of light incident into the non-accumulation area.

Moreover, the specific position of the accumulation area depends on the shape of the cavity 10, the shape of reflecting cover, and the location the light source 30 is amounted.

Specifically, the auxiliary light-guiding diffusion structure 40 is disposed on the reflective surface 11 and located in the accumulation area, and at least a portion of light incident into the accumulation area, after diffused by the auxiliary light-guiding diffusion structure 40, emits towards a direction with respect to the accumulation area away from the light source 30.

Compared to the case without mounting the auxiliary light-guiding diffusion structure 40, the present invention by providing the auxiliary light guiding diffusing structure 40, gathers the outgoing light in a part of the light-emitting surface (for example, a first area near the light source 30) after being reflected by the accumulation area. A part of this light is diffused by the auxiliary light-guiding diffusion structure 40 to be emitted from a region other than the part of the light-emitting surface (for example, a second area away from the light source 30), so that the light of the backlight module is uniformly diffused.

Specifically, in a preferred embodiment of the present invention, the reflecting cover 20 is C-shaped, the opening of the reflecting cover 20 faces the reflective surface 11, and the reflecting cover 20 is used to reflect the light emitted by the light source 30 to the light-emitting surface 13, the reflective surface 11 or the auxiliary light-guiding diffusion structure 40.

Specifically, the reflective surface 11 is for reflecting light onto the light-emitting surface 13 or the auxiliary light-guiding diffusion structure 40. In a preferred embodiment of the present invention, the reflective surface 11, the mounting surface 12 and the light-emitting surface 13 are connected to each other to form a closed cavity 10. The reflective surface 11 comprises a bottom surface 111 and three side surfaces 112. The bottom surface 111 is spaced apart from the light-emitting surface 13, and the three side surfaces 112 and the mounting surface 12 surround the bottom surface of the bottom surface 111 and are connected to the bottom surface 111. The light-emitting surface 13 and the three sides 112 are connected to the mounting surface 12. As such, the closed cavity 10 is formed through the bottom surface 111, the side surface 112, the mounting surface 12 and the light-emitting surface 13 connected together, wherein the reflective surface 11 is located on the inner side of the cavity 10 and provides a reflection function. The reflection function may be a mirror reflection function or a white reflection function, that is, the reflective surface 11 is a mirror reflective surface or a white reflective surface.

Figure 2:
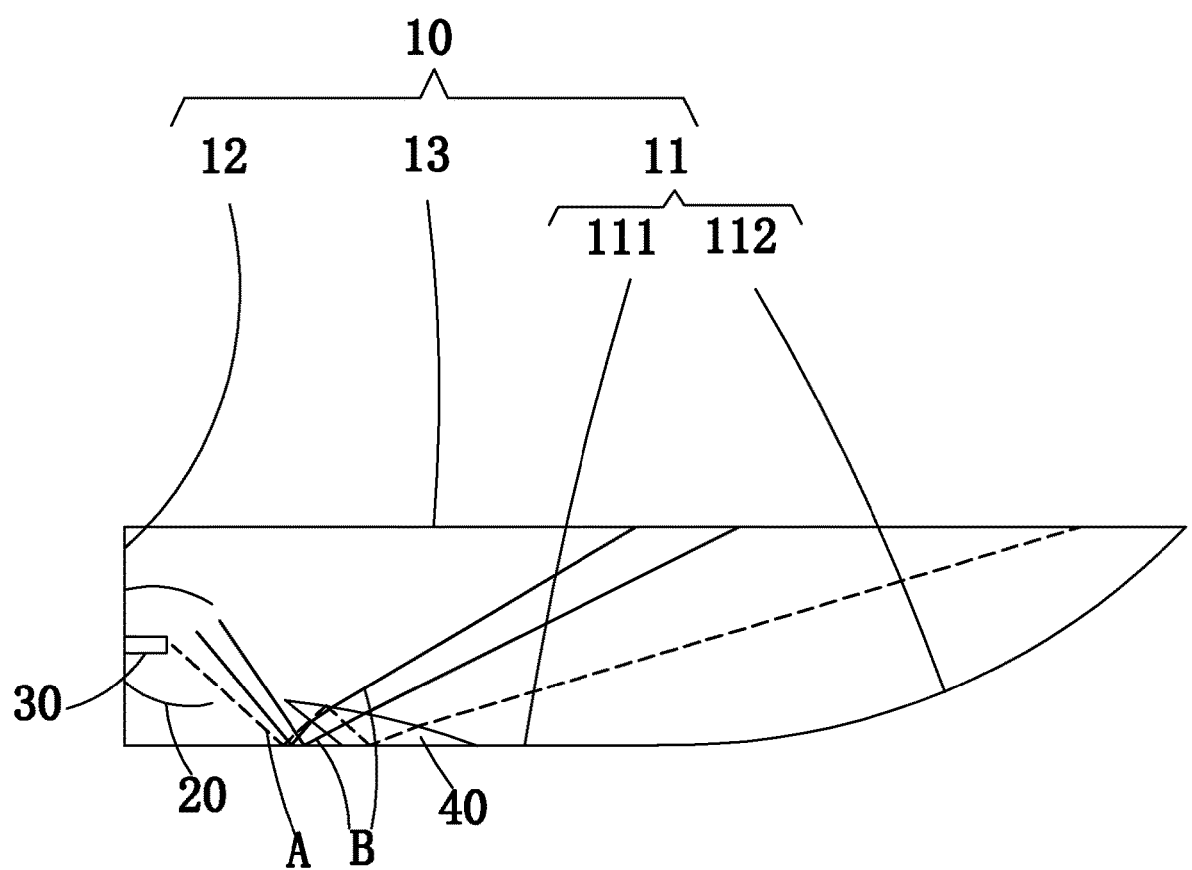
FIG. 2 is a schematic view showing the optical path of the backlight module of the present invention.
Figure 3:
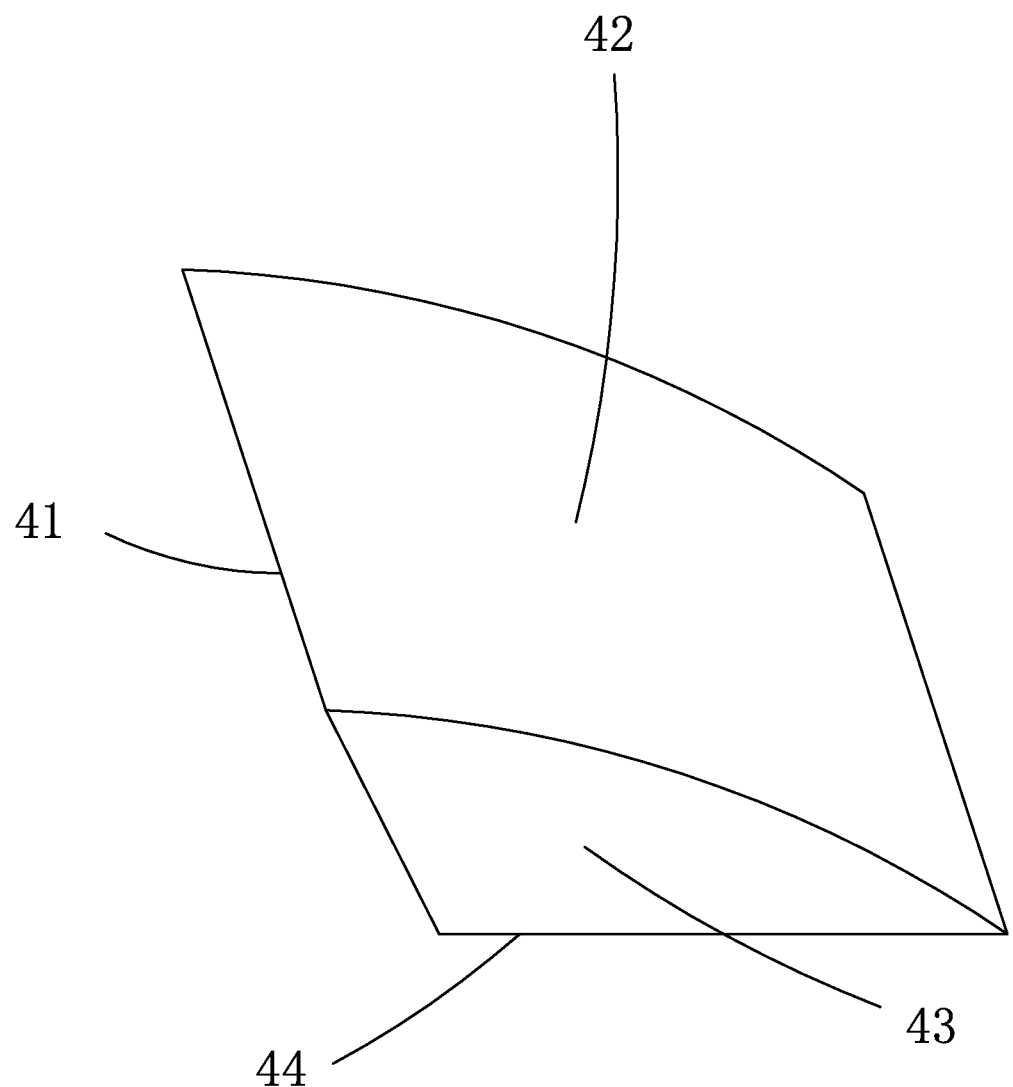
FIG. 3 is a schematic view showing the auxiliary light-guiding diffusion structure of the backlight module of the present invention.

Moreover, as shown in FIG. 1 and FIG. 2, in a preferred embodiment of the present invention, the bottom surface 111 is rectangular, and the three side surfaces 112 and the mounting surface 12 are respectively connected to one side of the bottom surface 111, and each of the three side surfaces 112 is an arc surface that is lifted toward the light-emitting surface 13 with respect to the bottom surface 111.

Specifically, in a preferred embodiment of the present invention, the accumulation area is located on the bottom surface 111 such that the auxiliary light-guiding diffusion structure 40 is disposed on the bottom surface 111.

Moreover, the auxiliary light-guiding diffusion structure 40 comprises: a light incident surface 41, a diffusion surface 42 connected to the light incident surface 41, two connecting side surfaces 43 oppositely disposed connected to the light incident surface 41 and the diffusing surface 42, and a connecting bottom surface 44 connected to the light incident surface 41, the diffusion surface 42, and the two connecting side surfaces 43; the light incident surface 41, the diffusion surface 42, the two connecting side surfaces 43 and the connecting bottom surface 44 together form a solid body structure;

the connecting bottom surface 44 is stacked on the bottom surface 111, the light incident surface 41 intersects the bottom surface 111 to form an acute angle, opening of the acute angle faces the light source 30, the diffusion surface 42 intersects the bottom surface 111, and intersection line is located at a side away from the light source 30.

Preferably, the light incident surface 41 is a plane, and the diffusion surface 42 is an arc surface.

Specifically, in a preferred embodiment of the present invention, as shown in FIG. 2, the auxiliary light-guiding diffusion structure 40 has two modes of propagation when diffusing light. The first mode of propagation is total reflection, such as the light A (dotted line) in FIG. 2, the light A is incident from the light incident surface 41 into the auxiliary light-guiding diffusion structure 40, and then reflected by the diffusion surface 42 back to the bottom surface 111, and then reflected by the bottom surface 111 back to the diffusion surface 42. After refracted by the diffusion surface 42, the light exiting from the light-emitting surface 13 away from the light source 30. The second propagation mode is refractive propagation, as shown by the two lights B (solid line) shown in FIG. 2. The light B is incident from the light incident surface 41 to the auxiliary light-guiding diffusion structure 40, is refracted by the diffusion surface 42, and is emitted from a part away from the light source 30 to the light-emitting surface 13. As such, the light emitted from the light-emitting surface 13 adjacent to the light source 30 is diffused to the area where the light-emitting surface 13 is away from the light source 30, thereby improving the uniformity of light emission of the backlight module and avoiding light accumulation and uneven brightness and darkness. In the case where only one light-emitting diode is required as the light source, the uniformly distributed light emission is realized, and the backlight effect is good.

Based on the backlight module described above, the present invention further provides an LCD device comprising the above backlight module.

In summary, the present invention provides a backlight module. The backlight module comprises: a cavity, a reflecting cover, a light source and an auxiliary light-guiding diffusion structure; the cavity comprising: a reflective surface, a mounting surface connected to the reflective surface, and a light-emitting surface connecting the reflective surface and the mounting surface; the light source being a light-emitting diode, the reflecting cover being mounted on the mounting surface, and the light source being disposed inside the reflector; the auxiliary light-guiding diffusion structure being disposed on the reflective surface and able to assist in diffusing the light incident to the reflective surface to improve light emission uniformity of the backlight module and display quality. Another object of the present invention is to provide an LCD device, using backlight module having a single LED as a light source and achieving brightness uniformity, able to improve display quality of the LCD device, reduce production cost of LCD device and increase product competitiveness.

It should be noted that in the present disclosure the terms, such as, first, second are only for distinguishing an entity or operation from another entity or operation, and does not imply any specific relation or order between the entities or operations. Also, the terms "comprises", "include", and other similar variations, do not exclude the inclusion of other non-listed elements. Without further restrictions, the expression "comprises a . . . " does not exclude other identical elements from presence besides the listed elements.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the clams of the present invention.

What is claimed is:

1. A backlight module, comprising: a cavity, a reflecting cover, a light source and an auxiliary light-guiding diffusion structure;
the cavity comprising: a reflective surface, a mounting surface connected to the reflective surface, and a light-emitting surface connecting the reflective surface and the mounting surface;
the light source being a light-emitting diode, the reflecting cover being mounted on the mounting surface, and the light source being disposed inside the reflecting cover;
the reflective surface having an accumulation area and a non-accumulation area outside the accumulation area, and the light source emitting a light directly onto the reflective surface or reflected by the reflecting cover and then incident on the reflective surface, and the light incident to the accumulation area having a density greater than the density of light incident into the non-accumulation zone;
the auxiliary light-guiding diffusion structure being disposed on the reflective surface and located in the accumulation area, and at least a portion of light incident into the accumulation area, after being diffused by the auxiliary light-guiding diffusion structure, emitting towards a direction with respect to the accumulation area away from the light source;
wherein the reflective surface comprises a bottom surface and three side surfaces, the bottom surface is spaced apart from the light-emitting surface, the three side surfaces and the mounting surface surround the bottom surface and are connected to the bottom surface, the light-emitting surface are connected to the three side surfaces and the mounting surface.

2. The backlight module as claimed in claim 1, wherein the side surfaces are arc surfaces with a side lifted toward the light-emitting surface with respect to the bottom surface.

3. The backlight module as claimed in claim 1, wherein the accumulation area is located at the bottom surface.

4. The backlight module as claimed in claim 1, wherein the auxiliary light-guiding diffusion structure comprises: a light incident surface, a diffusion surface connected to the light incident surface, two connecting side surfaces oppositely disposed connected to the light incident surface and the diffusing surface, and a connecting bottom surface connected to the light incident surface, the diffusion surface, and the two connecting side surfaces; the light incident surface, the diffusion surface, the two connecting side surfaces and the connecting bottom surface together form a solid body structure;

the connecting bottom surface is stacked on the bottom surface, the light incident surface intersects the bottom surface to form an acute angle, opening of the acute angle faces the light source, the diffusion surface intersects the bottom surface, and intersection line is located at a side away from the light source.

5. The backlight module as claimed in claim 4, wherein the light incident surface is a plane, and the diffusion surface is an arc surface.

6. The backlight module as claimed in claim 1, wherein the reflective surface is a mirror reflective surface or a white reflective surface.

7. The backlight module as claimed in claim 1, wherein the reflecting cover is C-shaped with an opening facing the reflective surface.

8. The backlight module as claimed in claim 1, wherein the auxiliary light-guiding diffusion structure is made of an acrylic material.

9. A liquid crystal display (LCD) device, comprising a backlight module as claimed in claim 1.

* * * * *